United States Patent
Park (10) Patent No.: US 6,754,274 B2
(45) Date of Patent: *Jun. 22, 2004

(54) VIDEO DATA RECORDING METHOD AND APPARATUS FOR HIGH-SPEED REPRODUCTION

(75) Inventor: Pan-gie Park, Ansan (KR)

(73) Assignee: Samsung Electronics Co., Ltd., Kyungki-Do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/763,733

(22) Filed: Dec. 11, 1996

(65) Prior Publication Data

US 2002/0118744 A1 Aug. 29, 2002

(30) Foreign Application Priority Data

Dec. 11, 1995 (KR) ............................................. 95-48430

(51) Int. Cl.[7] ................................................ H04N 7/12
(52) U.S. Cl. .................................... 375/240.25; 386/68
(58) Field of Search ................................ 348/400–402, 348/409–413, 415–416, 419, 700; 386/6–8, 33, 68, 81–82; 375/240.25; H04N 7/12

(56) References Cited

U.S. PATENT DOCUMENTS

| | | | | |
|---|---|---|---|---|
| 5,267,021 A | * | 11/1993 | Ramchandran et al. | 348/469 |
| 5,283,646 A | * | 2/1994 | Bruder | 375/240.12 |
| 5,305,113 A | * | 4/1994 | Iwamura et al. | 386/68 |
| 5,416,521 A | * | 5/1995 | Chujoh et al. | 375/240.14 |
| 5,436,665 A | * | 7/1995 | Ueno et al. | 375/240.14 |
| 5,455,629 A | * | 10/1995 | Sun et al. | 375/240.27 |
| 5,543,931 A | * | 8/1996 | Lee et al. | 348/423 |
| 5,649,047 A | * | 7/1997 | Takahashi et al. | 386/68 |
| 5,699,474 A | * | 12/1997 | Suzuki et al. | 386/68 |
| 5,754,241 A | * | 5/1998 | Okada et al. | 386/8 |
| 5,754,728 A | * | 5/1998 | Nakajima et al. | 386/68 |

FOREIGN PATENT DOCUMENTS

JP          7-50838          2/1995          ............ H04N/7/12

OTHER PUBLICATIONS

MPEG Textbook (Jun. 1, 1995 Second version) pp. 110–117; 154–165 ISBN–47561–0247–6.

* cited by examiner

*Primary Examiner*—Young Lee
(74) *Attorney, Agent, or Firm*—Sughrue Mion, PLLC (57) ABSTRACT

A video data decoding method and apparatus for high-speed reproduction of variable length encoded video information is provided to realize a more acceptable high-speed reproduced picture within a faster time. Each picture unit of data in the Group Of Pictures (GOP) layer has a picture header which contains user data which specifies the exact encoded length of that picture unit of data. If during high-speed reproduction that particular unit of picture data is to not to be displayed, then the whole unit of data may be skipped according to the user data which specifies how long the data unit is. Otherwise, there would be no way of knowing a priori how long the picture unit of data has been encoded to be and the entire unit must be read to search for the beginning of the next picture unit of data. As a result of the placement of information regarding the picture unit of data in the picture header, P-picture data as well as I-picture data may feasibly be used for high-speed reproduction.

14 Claims, 5 Drawing Sheets

PRIOR ART

FIG. 1

PRIOR ART

VIDEO DATA RECORDING METHOD AND APPARATUS FOR HIGH-SPEED REPRODUCTION

BACKGROUND OF THE INVENTION

The present invention relates to a system for decoding and reproducing digital video data encoded according to the MPEG (Moving Picture Experts Group) standard and recorded on a recording medium. More particularly, the present invention relates to a video data decoding method and apparatus for high-speed reproduction, in which user data regarding recorded pictures is used to record picture size information which is used to skip certain picture frames during the high-speed reproduction, to thereby reduce a reproduction time and display a more pleasing image.

New technologies for digitally processing video and audio signals have been proposed for high-quality video and audio. In the case of a video signal, it may be stored in a compact disk, a digital audio tape, a hard disk drive, and an optical disk, or transmitted via a telephone line, an integrated services digital network (ISDN), an ATM, a communication satellite, or a satellite broadcasting line. For this purpose, MPEG standards have been adopted (e.g., MPEG-1, parts 1–4; MPEG-2, parts 1–6 and 9) as an international standard for compressing and restoring digital video data. A digital video data compression algorithm proposed according to the MPEG includes essentially a discrete cosine transform (DCT), a quantization, a variable-length-coding and a motion compensation.

Figure 1:
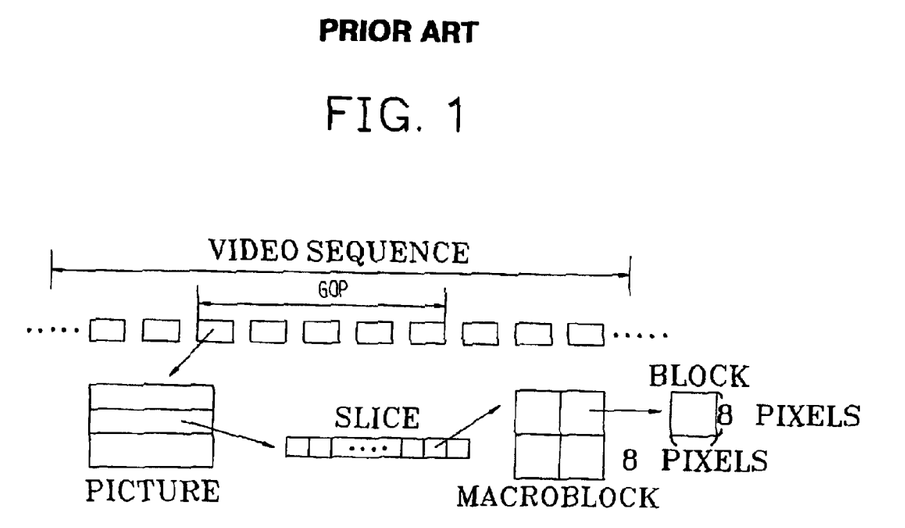
FIG. 1 shows a hierarchical structure of the MPEG video data.

According to the MPEG, the information included in a bit stream to be compressed and transmitted is arranged to have six hierarchical layers, as shown in FIG. 1.

FIG. 1 shows a hierarchical structure of the MPEG video data, including a video sequence layer being the uppermost layer, a GOP (group of pictures) layer being a basic unit for randomly accessing video data, a picture layer. Each picture in the picture layer is encoded as an intra-coded-picture (I-picture), a predictive-coded-picture (P-picture), or a bidirectionally-predictive-coded-picture (B-picture). The a video sequence layer is composed of a sequence header, one or more GOP groups and a sequence end code. In the case of a general movie, the entire movie is formed of a video sequence or several video sequences according to the contents of the movie.

Each picture is composed of plural slices of a slice layer in which various processing steps necessary for compression are independently performed on the slices so that an influence of a generated error is not transferred over a degree. Each slice is composed of plural macroblocks of a macroblock layer. The macroblock is the basic unit of data upon which motion compensation is performed. Each macroblock is composed of plural blocks in a block layer. Each block is defined as 8 horizontal pixels by eight vertical pixels and is the basic unit of the DCT.

The encoded video data which is recorded or transmitted by being arranged with the hierarchical structure described above is decoded via the process shown in FIG. 2 and regenerated into a reproduced image corresponding to an original image.

Figure 2:
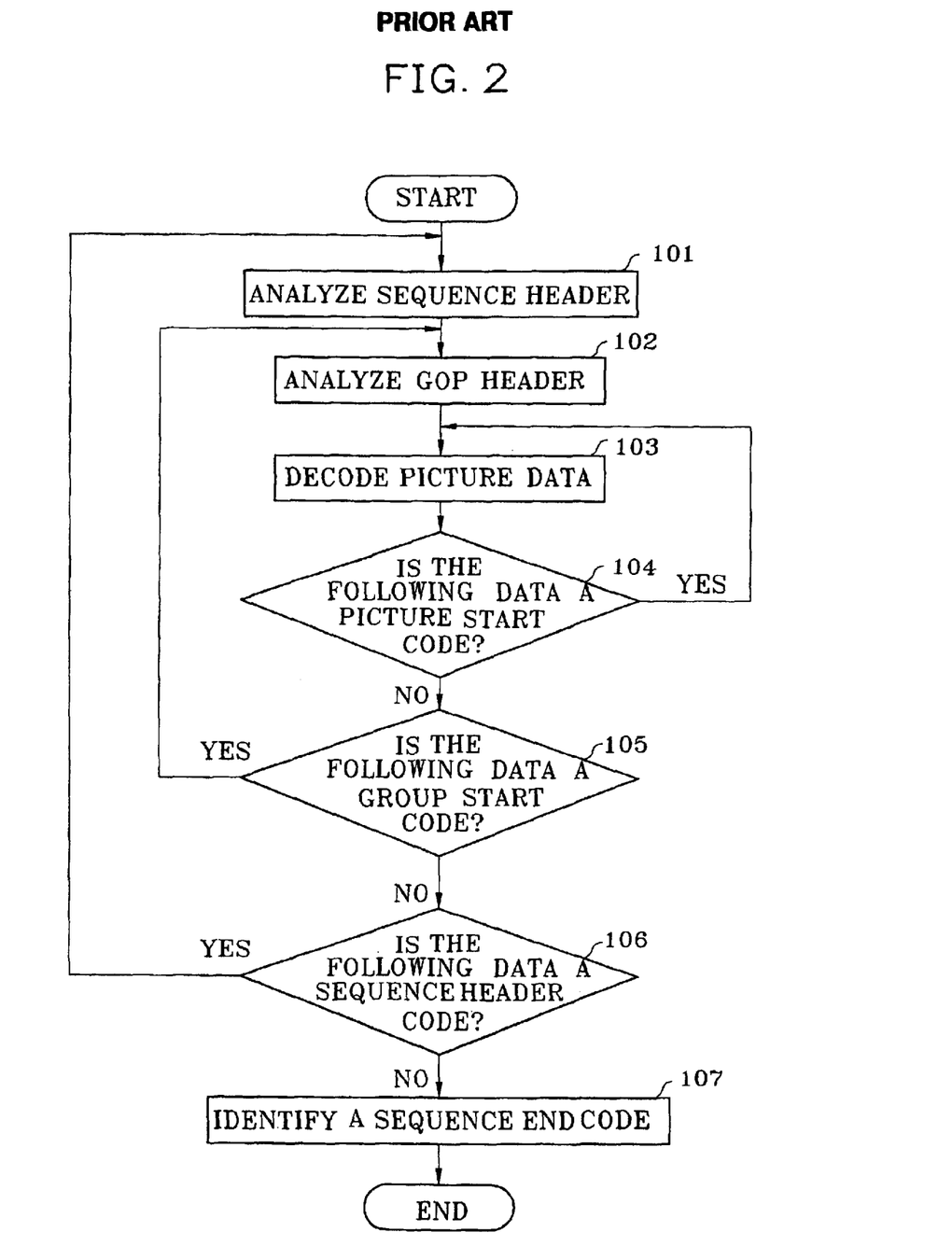
FIG. 2 is a flow chart for explaining a decoding method of the MPEG video data.

FIG. 2 is a flow chart for explaining a decoding method of the MPEG video data. First, a sequence header positioned in the leading end of the video sequence is analyzed from an input bit stream, to obtain necessary information such as a picture size and a picture rate (step 101). Then, a decoding operation starts in units of one or more GOPs constituting a vislequence layer. To perform a decoding operation on each GOP unit, a GOP header is analyzed (step 102) and one or more pictures constituting the GOP are decoded (step 103). After decoding one picture (an I-picture, a P-picture or a B-picture), it is checked whether the following data is a picture start code (step 104). If the following data is a picture start code in step 104, the program returns to step 103 to perform a decoding of the picture data successive to that picture start code. If the following data is not a picture start code in step 104, it is checked whether the following data is a group start code (step 105). If the following data is a group start code in step 105, then a new GOP unit is beginning and the program returns to step 102 to repetitively perform a decoding operation of the new GOP. If the following data is not a group start code in step 105, it is checked whether the following data is a sequence header code (step 106). If the following data is a sequence header code in step 106, the program returns to step 101 to repetitively perform the program from the analysis of the sequence header. If the following data is not a sequence header code in step 106, it is checked whether the following data is a sequence end code (step 107) since it should be generated, to then finish the decoding operation.

Figure 3:
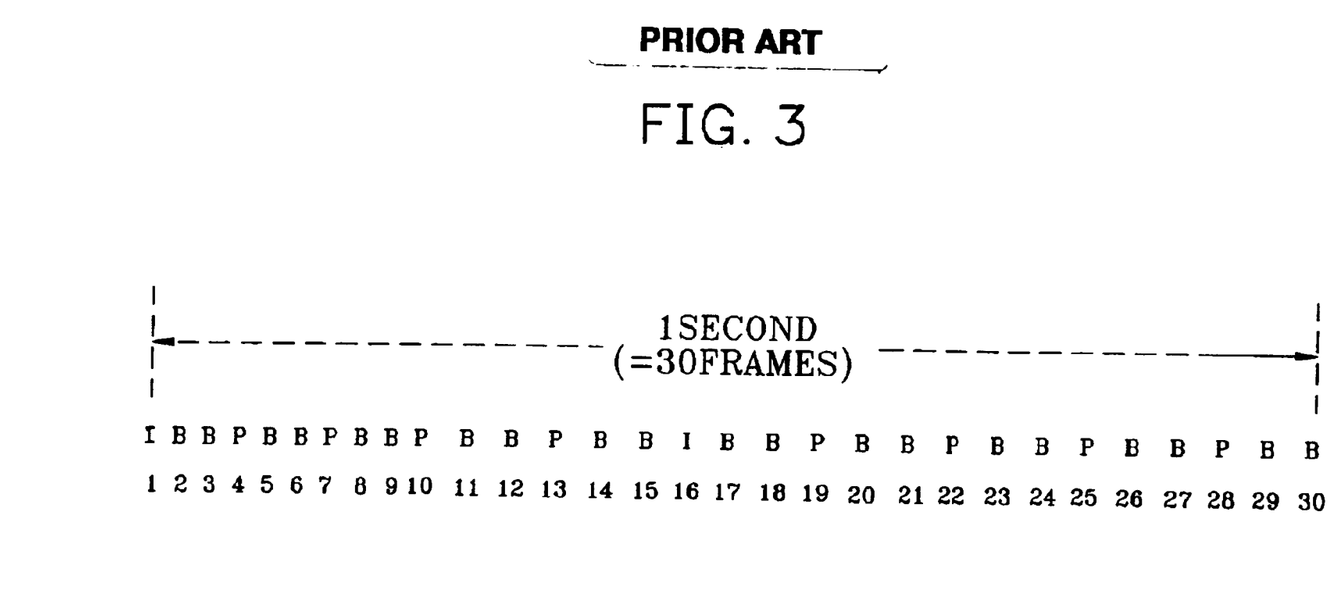
FIG. 3 shows the structure of a picture layer of the MPEG video data in the NTSC system.

The pictures whose decoding are performed in step 103 of FIG. 2 is composed of I-, P- and B-pictures as shown in FIG. 3. FIG. 3 shows the structure of a picture layer of the MPEG video data in i the NTSC system. As shown in FIG. 3, 30 frames are formed per one second, among which 2 frames are constituted by I-pictures, 8 frames are constituted by P-pictures and 20 frames are constituted by B-pictures. When an I-picture is encoded, the picture is reconstructed by only information of the I-picture itself, and encoded as it is via DCT without taking a difference. The I-pictures are inserted into some portions of frames to enable random access and high-speed reproduction, despite the poor encoding efficiency of intra-picture encoding. The P-picture is a reference picture for taking a difference, and uses a previously decoded I-picture or a P-picture which is time-led. The P-picture is encoded, either using a difference from a motion compensated predictive picture, or without using such a difference, which is selected in units of a macroblock for high efficiency. The B-picture is a predictive picture, and uses three kinds of pictures such as a previously decoded I-picture or a P-picture which is time-led or a previously decoded I-picture or P-picture which is time-lagged, and an interpolation picture which is made in both directions. Among a difference coding and an intra-coding after the motion compensation of the three above kinds, the coding providing the highest efficiency is selected in units of a macroblock.

When high-speed reproduction such as a fast forward play and a fast reverse play is performed using the above-described kinds of the pictures, only an I-picture is generally used, which is because it is possible to decode the following picture which is not decoded since each I-picture is independently encoded. However, since only data corresponding to the pictures of 2 frames per second is displayed in case of the NTSC system during the high-speed reproduction using only I-picture, an offensive picture is obtained, which is regarded as fast reproduction of a still image. Moreover, if data in a movie is high-speed reproduced, there is less correlation between pictures, which causes difficulty in grasping the contents of the movie.

It has been proposed that the P-picture as well as the I-picture be used to perform high-speed reproduction to solve the above problem. However, this solution requires that every B-picture positioned between one P-picture and the next P-picture, or between an I-picture and the next P-picture should be read. This consumes much decoding and reproduction time. As a result, a high-speed reproduction time becomes nearly equal to a normal reproduction time.

SUMMARY OF THE INVENTION

To solve the above problem, it is an object of the present invention to provide a video data decoding method for high-speed reproduction, in which picture size information is recorded in a picture to obtain a comfortable picture as well as to reduce a high-speed reproduction time and picture data can be skipped as many as a defined size.

It is another object of the present invention to provide an apparatus embodying the above video data decoding method for high-speed reproduction.

To accomplish the above object of the present invention, there is provided a video data decoding method for high-speed reproduction for decoding and reproducing variable bit rate encoded picture data, the video data decoding method comprising the steps of:

(a) analyzing overhead data positioned in the leading end of each picture unit of data and judging whether the picture unit of data is picture data to be decoded and reproduced during high-speed reproduction or picture data to be skipped without decoding during high-speed reproduction;

(b) judging whether a current reproduction mode is a high-speed reproduction mode or a normal reproduction mode;

(c) decoding and reproducing each input picture unit of data if it has been judged in said step (b) that the current reproduction mode is the normal reproduction mode;

(d) decoding and reproducing each input picture unit of data which has been judged in said step (a) to be picture data to be decoded and reproduced during high-speed reproduction, if it has been judged in said step (b) that the current reproduction mode is the high-speed reproduction mode; and (e) skipping without decoding each input picture unit of data, according to an amount of data of a predetermined picture size information, which has been judged in said step (a) to be picture data to be skipped without decoding during high-speed reproduction, if it has been judged in said step (b) that the current reproduction mode as the high-speed reproduction mode.

To accomplish the other object of the present invention, there is provided a video data decoding apparatus for high-speed reproduction for decoding and reproducing digital video data encoded according to the MPEG standard and recorded on a recording medium, the video data decoding apparatus comprising:

a microprocessor unit for analyzing input MPEG video data, for judging whether each unit of picture data corresponds to a picture which is to be decoded or to be skipped during high-speed reproduction, and for controlling decoding of the units of picture data judged to be decoded and skipping of the units of picture data judged to be skipped using predetermined information regarding the size of each of the units of picture data judged to be skipped;

a buffer for storing the input MPEG video data; and decoding means for decoding video data read from said buffer under control of said microprocessor unit.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings.

Figure 4:
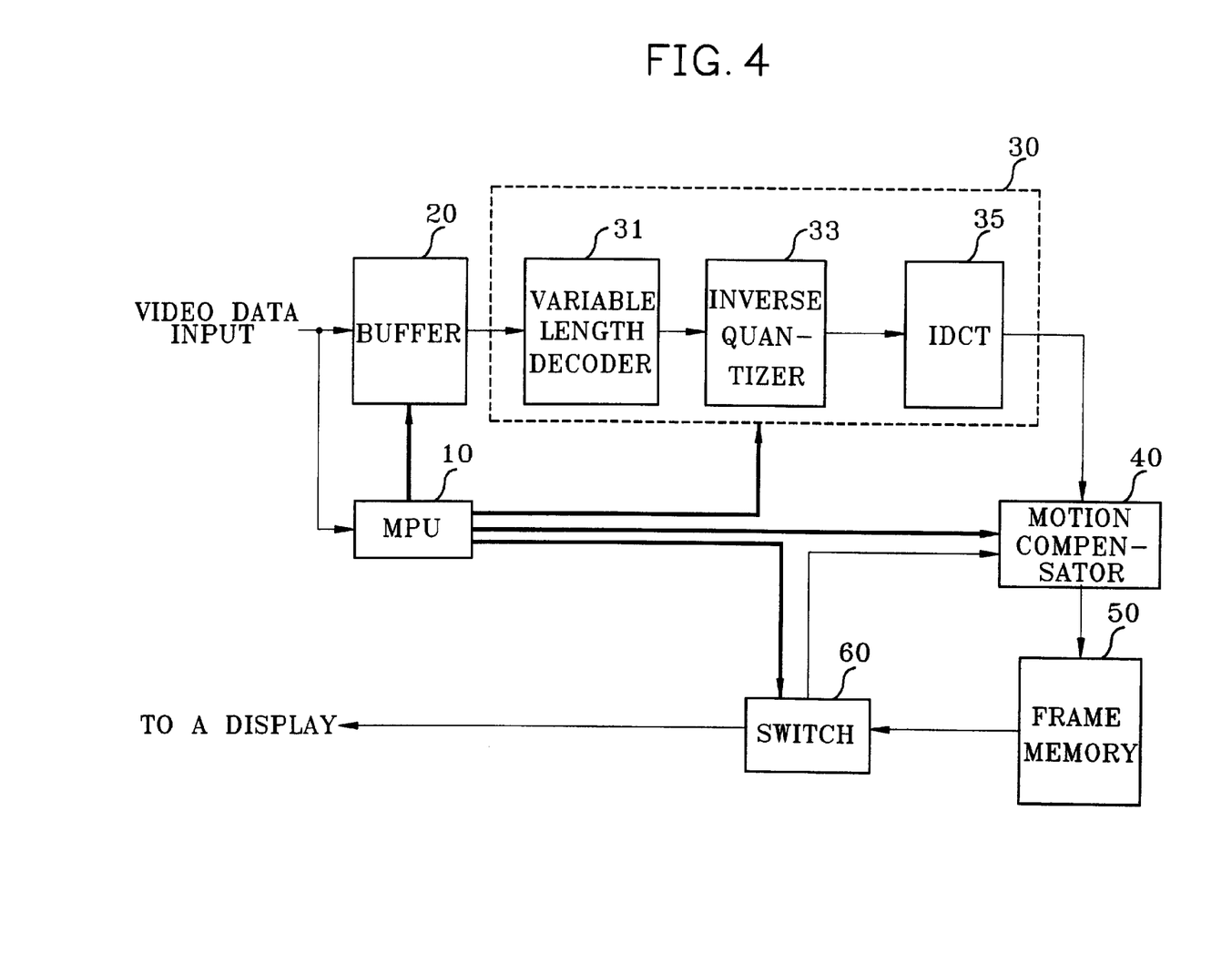
FIG. 4 is a block diagram showing a video data decoding apparatus for high-speed reproduction according to a preferred embodiment of the present invention.

Referring to FIG. 4, a video data decoding apparatus for high-speed reproduction according to a preferred embodiment of the present invention is shown. The general decoder 30 has a variable length decoder 31, an inverse quantizer 33, and an inverse discrete cosine transformer 35. Microprocessor unit (MPU) 10 controls the general operation of each block by analyzing the input MPEG video data and conforming to a chosen reproduction mode. Buffer 20 temporarily stores the input MPEG video data and outputs the stored video data to the decoder 30. Motion compensator 40 performs motion-compensating on the decoded data, and a frame memory 50 stores the motion-compensated picture unit data. Switch 60 selectively outputs the picture unit data read from the frame memory 50 to either the motion compensator 40 or a display (not shown).

Figure 5:
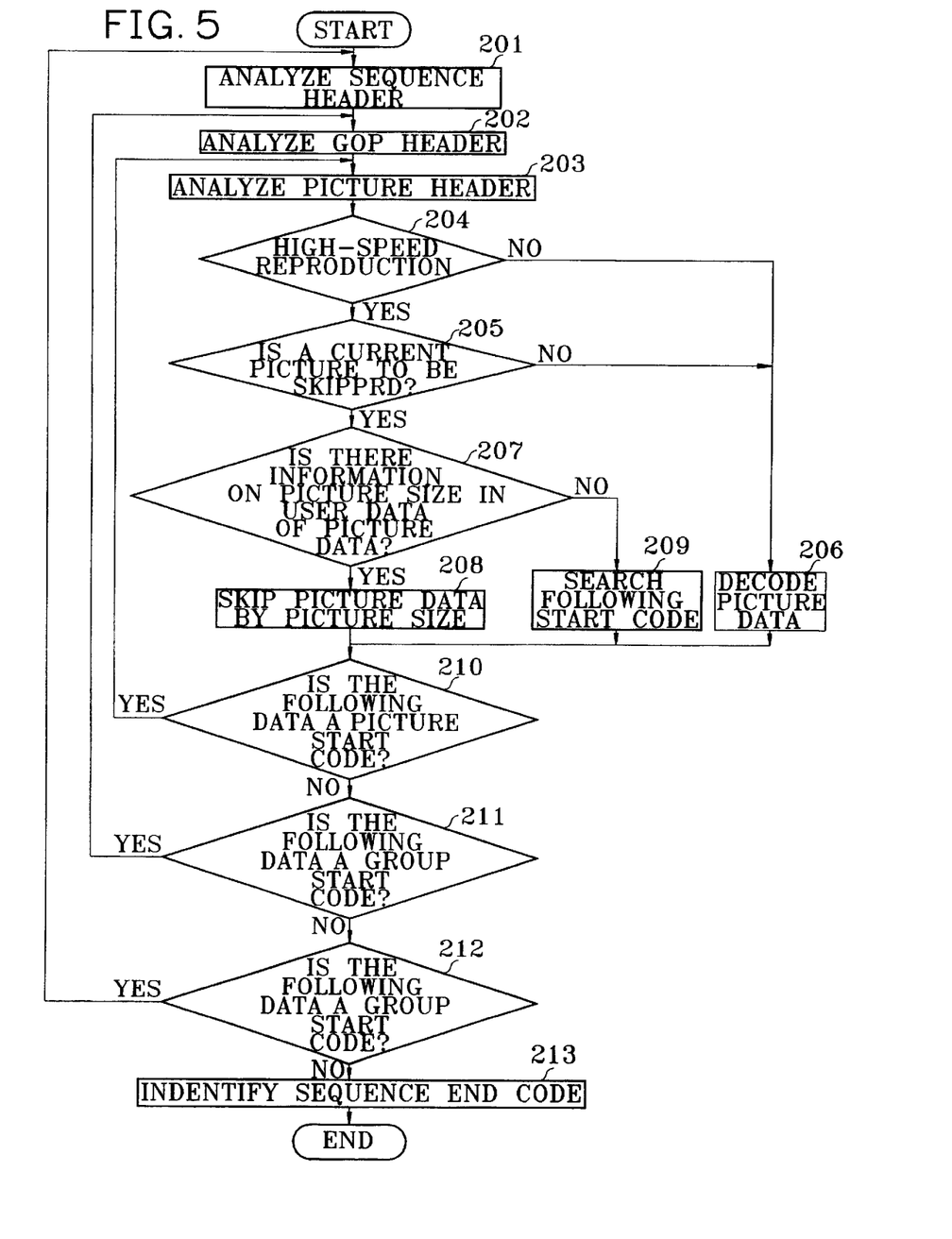
FIG. 5 is a flow chart for explaining the video data decoding method for high-speed reproduction in the FIG. 4 apparatus.

The operation of the video data decoding apparatus for high-speed reproduction according to the present invention having the above-described construction, will be described in more detail with reference to FIG. 5. FIG. 5 is a flow chart for explaining the video data decoding method for high-speed reproduction in the FIG. 4 apparatus.

A picture can include user data starting with a control code representing user data start. Although such user data has been generally defined to be used in the MPEG video data, the detailed usage has not been determined, and thus, user data is not used in actuality for MPEG video. Accordingly, the present invention defines the format of the user data as follows:

user data {user data start code; user data identification; picture size}

The above user data format uses—a user data start code representing user data start defined in the MPEG, enabling recognition of a start of user data by a decoder based on the MPEG. Then, user data id is established to enable a decoder to recognize the kind of the user data used, i.e., a picture size, and picture size data is established to define the encoded size of a corresponding picture. Since the I-picture, the P-picture and the B-picture in the MPEG video data are variable length coded, the encoded size of the picture is very variable according to complexity and brightness of the picture and the correlation between the preceding and following pictures. It is unnecessary, though, to read all that data and to compare the read data with a picture start code, in order to find a start point of the following picture, if a picture size is already known. If a picture size in the predetermined user data is used, it is possible to know the encoded size of the picture, to thereby quickly move to a start point of the following picture. Thus, the present invention can skip the picture data during high-speed reproduction using the picture size as defined above.

As shown in FIG. 5, the microprocessor unit 10 of FIG. 4 analyzes a sequence header positioned in the leading end of the video sequence from the input bit stream and obtains necessary information such as a picture size and a picture rate (step 201), to then start a decoding operation in units of a GOP. To perform a decoding operation in units of a GOP, a GOP header is firstly analyzed (step 202), and then data with respect to a picture constituting the GOP is analyzed. To analyze the picture data, a picture header is firstly analyzed (step 203) to recognize the kind of the picture. Thereafter, it is judged whether the current reproduction mode is a high-speed reproduction mode (step 204). If it is not the high-speed reproduction mode, the current picture data is decoded (step 206). If the current reproduction mode w is a high-speed reproduction mode, the microprocessor unit 10 judges whether the current picture is a picture kind of picture which is to be skipped during the high-speed reproduction (step 205). When only I-pictures are used during high-speed reproduction, the P-picture and the B-picture become pictures to be skipped, whereas when the I-picture and the P-picture are used, the B-picture become a picture to be skipped.

If the current picture is not a picture to be skipped, the microprocessor unit 10 decodes the picture data (step 206). On the other hand, if the current picture is a picture to be skipped, the microprocessor unit 10 analyzes the user data identification in the user data region in the picture and checks whether picture size information is defined in the user data region (step 207). That is, the microprocessor unit 10 identifies user data identification representing that there is picture size information in the user data region in the picture. If picture size information is provided in the user data, an amount of data is skipped corresponding to the picture size (step 208). If there is no picture size information, all data is read and discarded (i.e., skipped) until the subsequent picture start code is found (step 209).

The decoding operation in step 206 will be described in more detail with reference to FIG. 4. The MPEG video data received in the form of the bit stream is stored in a buffer 20. The MPEG video data stored in the buffer 20 is decoded in the variable length decoder 31 in the decoder 30 through an inverse process of the variable length coding. The data output from the variable length decoder 31 is rearranged in units of a block, inversely quantized in the inverse quantizer 33, and inversely transformed in the inverse discrete cosine transformer 35

Also, if there is information with respect to the motion compensation in the picture data, that is, a motion vector, the motion vector is supplied to the motion compensator 40. The motion compensator 40 reads the block corresponding to the motion vector from the picture unit data stored in the frame memory 50, and compensates the motion. Then, the motion compensator 40 adds the inversely transformed data and the motion compensated block data and stores the added data in the frame memory 50. Next, the switch 60 outputs the picture data stored in the frame memory 50 to the motion compensator 40 or a display (not shown) on which a picture is displayed under control of the microprocessor unit 10.

Returning to FIG. 5, if the picture unit decoding is ended (step 206), or the picture data is skipped as many as a picture size (step 208) and the following start code is found (step 209), it is checked whether the following data is a picture start code (step 210). If the following data is a picture start code, the microprocessor unit 10 returns to step 203 and analyzes a picture header, detects the kind of the picture, and repetitively performs the following steps (steps 204–209). If the following data is not a picture start code, the microprocessor 10 judges that a decoding operation is ended with respect to one GOP and then identifies whether the following data is a group start code (step 211). If the following data is a group start code, the microprocessor unit 10 returns to step 202 and begins a decoding operation with respect to the following GOP.

If the following data is not a group start code, the microprocessor unit 10 checks whether the following data contains a sequence header since there may be a sequence header (step 212). If the following data is a sequence header code in step 212, the microprocessor unit 10 returns to step 201 and repetitively perform the steps subsequent to the decoding of the sequence header. If the following data is not a sequence header code, the microprocessor unit 10 checks whether such a sequence end code is generated since the latter should be generated (step 213). This step is to identify that there is no abnormality in the data decoding process and to then end a decoding operation.

As described above, the video data decoding method and apparatus for high-speed reproduction according to the present invention defines picture code size information in each picture of a picture layer in the hierarchical structure of the MPEG video data. This is to enable recognition the size of a variable bit rate coded picture, and to skip the picture data via the size information during high-speed reproduction. Accordingly, the picture data can be quickly skipped to a start point of the following picture without recognizing all data with respect to the picture to be skipped, thereby realizing a more acceptable high-speed reproduced picture within a faster time.

While only certain embodiments of the invention have been specifically described herein, it will apparent that numerous modifications may be made thereto without departing from the spirit and scope of the invention.

What is claimed is:

1. A video data decoding apparatus for high-speed reproduction for decoding and reproducing digital video data encoded according to a Moving Picture Experts Group (MPEG) standard and recorded on a recording medium, the video data decoding apparatus comprising:

a microprocessor unit for analyzing input MPEG video data, for judging whether each unit of picture data of said MPEG video data corresponds to a picture which is to be decoded or to be skipped during high-speed reproduction, and for controlling decoding of units of said picture data which are judged to be decoded and skipping reading of units of said picture data which are judged to be skipped, based on predetermined picture size information, contained at a user data region corresponding to each of said units of said picture which are judged to be skipped, the predetermined picture size information specifies an amount of encoded picture data representing a respective one of the units of said picture data;

a buffer for storing said input MPEG video data; and decoding means for decoding video data read from said buffer under control of said microprocessor unit.

2. The video data decoding apparatus for high-speed reproduction according to claim 1, wherein, during a normal reproduction mode, said microprocessor unit controls said decoding means to decode all units of picture data of the input MPEG video data; and wherein, during high-speed reproduction, said microprocessor unit controls said decoding means to decode only the units of picture data which have been judged to be decoded, and to skip decoding of the units of picture data judged to be skipped according to the predetermined information regarding the size of each of the units of picture data judged to be skipped.

3. The video data decoding apparatus for high-speed reproduction according to claim 1, wherein said decoding means comprises:

a variable length decoder for variable-length-decoding the video data read from said buffer to produce decoded video data;

an inverse quantizer for inversely quantizing the decoded video data to produce decoded, inverse-quantized video data; and an inverse discrete cosine transformer for inversely discrete-cosine-transforming the decoded, inverse-quantized video data to produce reconstructed video data.

4. The video data decoding apparatus for high-speed reproduction according to claim 3, wherein said decoding means further comprises:

motion compensation means for motion-compensating the reconstructed video data according to a motion vector when it is judged by said microprocessor unit that the video data read from the buffer includes the motion vector.

5. The video data decoding apparatus for high-speed reproduction according to claim 4, wherein said motion compensation means comprises:

a frame memory for storing the decoded, reconstructed video data;

a motion compensator for motion-compensating data corresponding to the motion vector among reconstructed video data stored in said frame memory, adding the motion-compensated video data to the reconstructed video data and outputting the added result to said frame memory; and a switch, which receives as an input contents output from said frame memory, and which selectively outputs the output of said frame memory to said motion compensator or to a display.

6. A video data decoding method for high-speed reproduction for decoding and reproducing variable bit rate encoded picture data, the video data decoding method comprising the steps of:

(a) analyzing overhead data positioned in the leading end of each input picture unit of encoded data and judging whether the picture unit of said encoded data is picture data to be decoded and reproduced during high-speed reproduction or picture data to be skipped without decoding during high-speed reproduction;

(b) judging whether a current reproduction mode is a high-speed reproduction mode or a normal reproduction mode;

(c) decoding and reproducing each input picture unit of data if it has been judged in said step (b) that the current reproduction mode is the normal reproduction mode;

(d) decoding and reproducing each input picture unit of data which has been judged in said step (a) to be picture data to be decoded and reproduced during high-speed reproduction, if it has been judged in said step (b) that the current reproduction mode is the high-speed reproduction mode; and (e) skipping without reading each input picture unit of data which has been judged in said step (a) to be picture data to be skipped without decoding during high-speed reproduction, if it has been judged in said step (b) that the current reproduction mode as the high-speed reproduction mode, wherein an amount of data to be skipped without reading for each input picture unit of data which has been judged to be skipped is determined according to predetermined picture size information provided at a user data region corresponding to a respective input picture unit of data which has been judged to be skipped, the predetermined picture size information specifies an amount of encoded picture data corresponding to the respective input picture unit of data.

7. The video data decoding method for high-speed reproduction according to claim 6, wherein said picture size information is defined in a user data region in picture units of data when a data structure of a Moving Picture Experts Group (MPEG) standard is used, and existence of said picture size information is represented via user data identification.

8. The video data decoding method for high-speed reproduction according to claim 7, wherein in said step (e), all data is read and skipped until a start code of predetermined data structure is input if the picture size information is not defined in the user data region of the input picture unit of data to be skipped.

9. The video data decoding method for high-speed reproduction according to claim 7, wherein in said step (a), a video sequence header constituting overhead data, a group of picture (GOP) header disposed in succession to the sequence header, and a picture header disposed in succession to the GOP header are sequentially analyzed.

10. A video data decoding apparatus for high-speed reproduction for decoding and reproducing variable bit rate encoded picture data, the video data decoding apparatus comprising:

a microprocessor unit for analyzing input picture units of data, for judging whether each picture unit of data corresponds to a picture which is to be decoded or to be skipped during high-speed reproduction, and for controlling decoding of the picture units of data judged to be decoded and skipping of the units of said encoded picture data judged to be skipped based on predetermined picture size information, contained at a user data region corresponding to each of said units of said picture which are judged to be skipped, wherein the microprocessor unit determines a starting point of a next picture unit based on the predetermined picture size information and controls skipping to the starting point of the next picture when it is judged that a picture is to be skipped, and the predetermined picture size information specifies an amount of encoded picture data representing one of the picture units;

a buffer, said buffer receiving as an input said input picture units of data for storage; and decoding means, said decoding means receiving picture units of data read from said buffer under control of said microprocessor unit to decode picture units of data which have been judged by said microprocessor to be decoded.

11. The video data decoding apparatus for high-speed reproduction according to claim 10, wherein, during a normal reproduction mode, said microprocessor unit controls said decoding means to decode all of said input picture units of data; and wherein, during high-speed reproduction, said microprocessor unit controls said decoding means to decode only the picture units of data which have been judged to be decoded, and to skip decoding of the picture units of data judged to be skipped according to the predetermined information regarding the size of each of the units of picture data judged to be skipped.

12. The video data decoding apparatus for high-speed reproduction according to claim 10, wherein said decoding means comprises:
   a variable length decoder for variable-length-decoding picture units of data from said buffer to produce decoded video data;
   an inverse quantizer for inversely quantizing the decoded video data to produce decoded, inverse-quantized video data; and
   an inverse discrete cosine transformer for inversely discrete-cosine-transforming the decoded, inverse-quantized video data to produce reconstructed video data.

13. The video data decoding apparatus for high-speed reproduction according to claim 10, wherein said microprocessor unit judges only picture units of data which have been encoded as intra-coded-pictures as being for decoding.

14. The video data decoding apparatus for high-speed reproduction according to claim 10, wherein said microprocessor unit judges only picture units of data which have been encoded as intra-coded-pictures or as predictive-coded-pictures as being for decoding.

* * * * *